Figure 1:
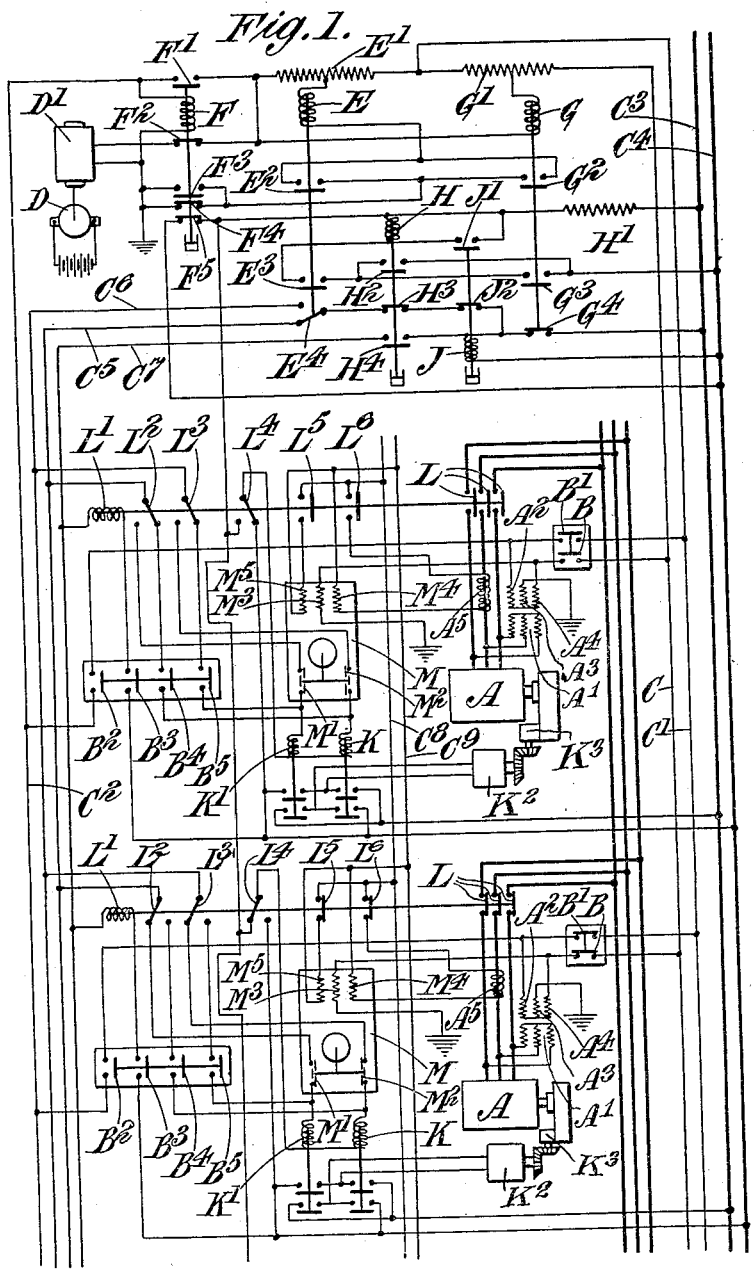

March 29, 1932. T. R. WARREN 1,851,790
ELECTRIC SYNCHRONIZING APPARATUS
Filed Sept. 19, 1928 2 Sheets-Sheet 1

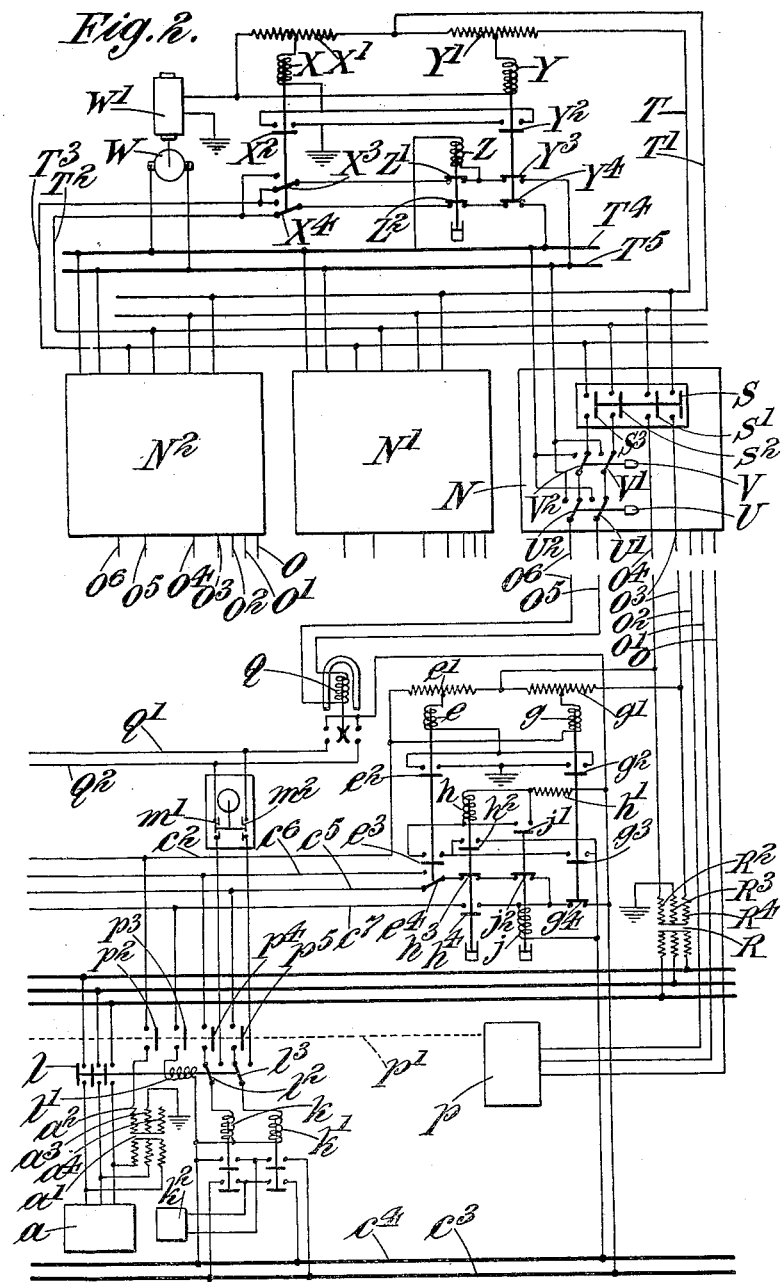

Patented Mar. 29, 1932

1,851,790

UNITED STATES PATENT OFFICE

THOMAS REGINALD WARREN, OF NORTON-ON-TEES, ENGLAND, ASSIGNOR TO A. REYROLLE & COMPANY LIMITED, OF HEBBURN-ON-TYNE, ENGLAND, A COMPANY OF GREAT BRITAIN

ELECTRIC SYNCHRONIZING APPARATUS

Application filed September 19, 1928, Serial No. 306,994, and in Great Britain October 5, 1927.

This invention relates to electric synchronizing apparatus for controlling the speed or frequency of an A. C. dynamo-electric machine, and although not limited thereto is especially applicable to the control of the frequency of an electric system supplied from a group of dynamo-electric machines operating in parallel.

The apparatus according to the invention comprises a source of E. M. F. of standard frequency, means for raising or lowering the speed of the machine to be controlled, and one or more relays which are operated in accordance with the relation between the machine speed or frequency and the standard frequency and act selectively to operate the speed-controlling means. Conveniently the relays are energized from the source of E. M. F. of standard frequency and from a second source of E. M. F. derived from the electric system supplied from the machine, and act to vary the speed of the machine to bring the frequencies of the two sources of E. M. F. into agreement.

When the invention is applied to the control of the frequency of an electric system supplied from a group of dynamo-electric machines, devices responsive to the load conditions in the system and acting to ensure a proper distribution of the load to the machines are preferably employed to cooperate with the frequency-responsive relays in the control of the system frequency. Thus when the share of the load taken by an individual machine lies outside predetermined limits, the load-sharing device associated with that machine may act to prevent the speed of the machine from being altered by the action of the frequency-responsive relays if such alteration would tend to make the load taken by the machine deviate further from such limits.

The system of relays normally responsive to the relation between the standard frequency and the frequency of the system may also be utilized, when required, to control the synchronizing and bringing into circuit of an additional machine. This may be effected by providing a change-over relay which acts to change over the connections of the system of relays from the source of E. M. F. of standard frequency to a third source of E. M. F. derived from the incoming machine, the relays still remaining connected to the second source of E. M. F. which is derived from the system.

The manner in which the frequency-responsive relays are arranged may vary, but preferably an arrangement is employed similar to that described in the specification accompanying the concurrent application for Letters Patent of the United States of America Serial No. 271825, now Patent Number 1,808,124, granted to Warren and Cooke. In this specification the relay arrangement is employed for the purpose of controlling the connection of an incoming machine into circuit with running machines, and preferably comprises a synchronizing relay which receives its maximum energizing current when the voltages of the incoming and running machines are in phase with one another, and an auxiliary synchronizing relay which acts to render the synchronizing relay inoperative for one direction of relative rotation of the incoming and running machines, these relays acting through other relays to control the speed of the incoming machine and its connection into circuit.

This arrangement may readily be extended to the remote frequency and load control on a number of substations over pilot wires from a control station. Thus in one convenient arrangement the source of E.M.F. of standard frequency and the system of frequency controlling relays are located at the control station, whilst a source of E.M.F. derived from the system in each substation can be connected to the system of relays through pilot wires. Each substation is provided with devices for automatically sharing the load amongst the individual machines in the substation, and hand-operated means are provided at the control station for controlling the distribution of load amongst the substations, such hand-operated means or the frequency-controlling relays acting in conjunction with the automatic load-sharing devices to control the speed of the machines in each substation. Each substation may have a system of relays for controlling the synchronizing and bringing into circuit of an additional machine, and a selective remote control arrangement may be provided whereby an operator at the control station can select an individual machine and cause the selected machine to be synchronized and brought into circuit under the control of such system of relays.

The invention may be carried into practice in various ways, but two convenient arrangements according thereto are illustrated by way of example in the accompanying drawings, in which Figure 1 shows the application of the invention to the control of an adjacent group of machines operating in parallel, and Figure 2 illustrates the application of the invention to the remote control of a number of substations.

In the arrangement of Figure 1 each machine A is provided with a potential transformer $A^1$, whose secondary phase-windings $A^2$ $A^3$ $A^4$ are connected in star on one side. The free end of one secondary phase-winding $A^3$ is earthed and those of the other windings $A^2$ $A^4$ are connected to sockets into which synchronizing and busbar plugs can be inserted. Thus the lagging phase $A^4$ of each secondary may be connected through a busbar plug B to a lagging phase busbar C, and the leading phase $A^2$ may be connected either through a synchronizing plug $B^2$ to a synchronizing busbar $C^2$ or through a busbar plug $B^1$ to a leading phase busbar $C^1$. The busbar plugs B $B^1$ are inserted in their sockets when the corresponding machines are in operation and connected to the load circuit, whilst the synchronizing plugs $B^2$ are only inserted when the corresponding machine is to be synchronized and brought into circuit. These three busbars C $C^1$ $C^2$ lead to the synchronizing apparatus.

In order to control the frequency of the system supplied by the machines, a constant speed motor-generator set is provided, comprising a D. C. motor D driving an A. C. generator $D^1$, one side of which is earthed whilst the other is connected to the synchronizing apparatus now to be described.

A resistance $E^1$ having a mid-point tapping is connected on one side to the leading phase busbar $C^1$ and on the other side to two of the sets of contacts $F^1$ $F^2$ of a change-over relay F, these contacts being connected on the other side respectively to the synchronizing busbar $C^2$ and to the lead from the A. C. generator $D^1$. The operating coil of the change-over relay F is connected between earth and the synchronizing busbar $C^2$, and the relay is therefore only energized to connect the synchronizing busbar $C^2$ to the resistance $E^1$ when a synchronizing plug $B^2$ is inserted. The mid-point tapping on the resistance $E^1$ is connected to one side of a synchronizing relay E, the other side of which is connected to earth through normally open contacts $G^2$ on an auxiliary synchronizing relay G. This auxiliary synchronizing relay is connected on one side to the synchronizing busbar $C^2$ or to the lead from the A. C. generator $D^1$ and on the other side to a mid-point tapping on a resistance $G^1$ connected between the leading and lagging phase busbars $C^1$ C. Thus the synchronizing relay E cannot lift its contacts unless the auxiliary synchronizing relay G has already been energized, but when it does so it at once makes its own retaining circuit at contacts $E^2$ so that the fall of the contacts is independent of the ball of the auxiliary synchronizing relay contacts $G^2$.

In addition to the two synchronizing relays E G, the synchronizing apparatus includes also a time-lag relay H and an interrupter relay J, which can be energized from a D. C. source $C^3$ $C^4$. The energizing circuit for the time-lag relay H is taken through a resistance $H^1$ and through normally open contacts $E^3$ and $G^3$ on the synchronizing relay E and the auxiliary synchronizing relay G. Thus when both synchronizing relays E G are energized, the contacts of the time-lag relay H begin to lift this relay completing its own retaining circuit at contacts $H^2$ to render it independent of the auxiliary synchronizing relay G as soon as the lifting movement has commenced. This time-lag relay H however still remains dependent on the synchronizing relay E and its contacts fall instantaneously as soon as the synchronizing relay contacts $E^3$ fall.

The interrupter relay J, which also has a time-lag associated with its lift but not its fall, is energized through normally closed contacts $C^4$ on the auxiliary synchronizing relay G. When the interrupter relay J completes its lift it acts at contacts $J^1$ to short-circuit the operating coil of the time-lag relay H and also at contacts $J^2$ to break a circuit from the D. C. busbar $C^3$ through the normally closed contacts $H^3$ and $G^4$ on the time-lag relay $H^3$ and the auxiliary synchronizing relay G to change-over contacts $E^4$ on the synchronizing relay E, the other sides of which are connected respectively to two speed-control busbars $C^5$ $C^6$. Thus when the synchronizing relay E is deenergized this circuit leads to one speed-control busbar $C^5$, whilst when the synchronizing relay contacts $E^4$ are lifted the other speed-control busbar $C^6$ is connected up.

Normally closed contacts $G^4$ on the auxiliary synchronizing relay G and normally open contacts $H^4$ on the time-lag relay H also control a circuit from the D. C. busbar $C^3$ to a circuit-breaker closing busbar $C^7$. The change-over relay F besides controlling the circuits from the synchronizing busbar $C^2$ and from the A. C. generator $D^1$ has other sets of contacts, one of which $F^5$ acts to short-circuit the time-lag relay H when the change-over relay F is deenergized, whilst two others $F^3$ $F^4$ (one normally open and one normally closed) are connected in parallel in the earth connection from the synchronizing relay E, so that as soon as the change-over relay F is operated the synchronizing relay is deenergized, the completion of the movement of the change-over relay contacts $F^3$ after its time-lag however reestablishing the energizing circuit for the synchronizing relay E. The reason for this will be explained later.

The two speed-control busbars $C^5$ $C^6$ serve to carry energizing current respectively to a raise-speed contactor K and a lower-speed contactor $K^1$, with which each machine A is provided. These contactors K $K^1$ control the polarity of the energizing current supplied from the D. C. busbars $C^3$ $C^4$ to an auxiliary motor $K^2$ which controls the speed of the machine A, for example by operating the governing mechanism $K^3$ of a steam turbine or other prime mover (indicated at $K^4$) by which the machine A is driven. Thus when the raise-speed contactor K is energized the auxiliary motor $K^2$ is driven in one direction to raise the machine speed, whilst the energization of the lower-speed contactor $K^1$ causes the auxiliary motor $K^2$ to be driven in the reverse direction to lower the machine speed. The circuits from the two speed-control busbars $C^5$ $C^6$ to the two contactors K $K^1$ are taken through auxiliary change-over contacts $L^2$ $L^3$ on the main circuit-breaker L which connects the machine A to the load circuit, and thence according to whether the circuit-breaker L is open or closed either through synchronizing auxiliary contacts $B^4$ $B^5$ which are closed when the machine is to be synchronized and connected to the load circuit or through interlock contacts $M^1$ $M^2$ on a load-sharing device M associated with the machine, each speed-control busbar thus being connected alternatively to the raise-speed contactor K or to the lower-speed contactor $K^1$ in accordance with the position of the circuit-breaker. The circuit-breaker closing busbar $C^7$ is connected to the closing coil $L^1$ of the main circuit-breaker L of each machine through synchronizing auxiliary contacts $B^3$ closed only when the machine is to be synchronized. Auxiliary contacts $L^4$ on the circuit-breaker L control the energizing circuit to the raise-speed and lower-speed contactors K $K^1$, so that when the circuit-breaker is open these contactors are directly connected to the D. C. busbar $C^4$ whilst when the circuit-breaker is closed this connection is taken through the contacts $F^5$ on the change-over relay.

Any suitable load-sharing arrangement may be used which is such as to ensure a proper distribution of load among the running machines. Conveniently the load-sharing arrangement forming the subject of the co-pending application for Letters Patent of the United States of America Serial No. 274890 filed May 3, 1928, now Patent Number 1,714,656. When this arrangement is applied to the present system, each machine A is provided with a relay M of the wattmeter type, having a voltage coil $M^3$ connected between earth and the lagging phase $A^4$ of the potential transformer $A^1$ and two differentially arranged current coils $M^4$ $M^5$. The current coil $M^4$ is connected in series with the secondary $A^5$ of a current transformer connected to the machine terminals, and the current transformer secondaries $A^5$ on all the machines are connected in parallel to summation busbars $C^8$ $C^9$ through auxiliary contacts $L^6$ on the circuit-breakers L, these contacts $L^6$ being open when the circuit-breakers are open. Thus the current coil $M^4$ is energized in accordance with the load on the associated machine, whilst the other current coil $M^5$, which is connected across the summation busbars $C^8$ $C^9$ through auxiliary contacts $L^5$ open when the circuit-breaker L is open, is energized in accordance with the average load on all the machines in commission. The interlock contacts $M^1$ $M^2$ on the relay M are so arranged that both are normally closed, but that one of them $M^2$ opens when the machine is taking too great a load and thus prevents the energization of the raise-speed contactor K, whilst the other $M^1$ opens when the machine is taking too small a load to prevent energization of the lower-speed contactor $K^1$.

The operation of the apparatus will now be described first of all with reference to frequency control for a number of running machines when the conditions are not such as to require bringing an additional machine into circuit. In this case all the synchronizing plugs $B^2$ $B^3$ $B^4$ $B^5$ will be out of their sockets so that the synchronizing busbar $C^2$ is deenergized whilst the busbar plugs B $B^1$ associated with the running machines are in their sockets to energize the leading and lagging phase busbars C $C^1$.

Owing to the deenergization of the synchronizing busbar $C^2$ the change-over relay F will be deenergized, with the result that the time-lag relay H is short-circuited whilst the synchronizing and auxiliary synchronizing relays E G are connected up to compare the frequency of the system supplied by the running machines with that of the A. C. generator $D^1$. So long as the two frequencies are in agreement the synchronizing relay contacts will be lifted and the auxiliary synchronizing relay G will be deenergized so that the interrupter relay contacts $J^1$ $J^2$ are in their lifted position. Under these conditions the two speed-control busbars $C^5$ $C^6$ (which are connected to the two speed-control contactors $K^1$ K of each running machine through the circuit-breaker auxiliary contacts $L^2$ $L^3$ and the wattmeter relay contacts $M^1$ $M^2$) are deenergized.

If now the load conditions in the load circuit change to any considerable extent, the result will be an uneven distribution of the load among the machines and a change in the frequency of the system. Some of the wattmeter relays M will thus open one or other of their interlock contacts $M^1$ or $M^2$ and the normal condition of the synchronizing relays will be changed.

The manner of operation of the synchronizing relays can best be described with reference to the rotation of the needle of a rotary synchroscope, which will be assumed to be connected up in the usual manner to indicate the relationship between the two frequencies.

The synchronizing relay E receives its maximum energizing current when the synchronoscope needle reaches its synchronizing position, and is set to lift its contacts 50° before that position is reached, these contacts falling 150° after the synchronizing position is passed. The voltage across the operating coil of the auxiliary synchronizing relay G becomes zero 30° after the synchronizing position is reached when the frequency of the system is less than the frequency of the A. C. generator or 30° before the synchronizing position if the system frequency is greater than that of the A. C. generator $D^1$. This relay G is set to lift its contacts 120° after its zero position is passed, the contacts falling 35° before the zero position is reached. Thus with the system frequency too high the auxiliary relay G will lift its contacts 90° after the synchronizing position and will drop them again 65° before the synchronizing position, so that the contacts $G^2$ will be down during the period when the synchronizing relay E could be energized. The synchronizing relay E therefore remains inoperative so long as the system frequency is too high. On the other hand with the system frequency too low the auxiliary synchronizing relay G will lift its contacts 150° after the synchronizing position and drop them 5° before the synchronizing position, whilst the synchronizing relay contacts will lift 50° before the synchronizing position and fall 150° after the synchronizing position simultaneously with the lifting of the auxiliary synchronizing relay contacts.

If now the change in load conditions has caused the system frequency to be increased, the auxiliary synchronizing relay contacts $G^2$ will repeatedly rise and fall but the synchronizing relay E will remain deenergized and will thus prepare the circuit through one speed-control busbar $C^5$ and such wattmeter interlock contacts $M^1$ as are closed to the lower-speed contactors $K^1$. This circuit is controlled by normally closed contacts $G^4$ and $J^2$ on the auxiliary synchronizing relay G and on the interrupter relay J. If the change in frequency has been large the synchroscope needle will be rotating too fast for the interrupter relay J to operate its contacts, and consequently the energizing current supplied to the lower-speed contactors $K^1$, and therefore also to the corresponding auxiliary motors $K^2$, will be intermittently interrupted owing to the rise and fall of the auxiliary synchronizing relay contacts $G^4$. Thus the speed of all the machines (except those taking too small a load) is lowered gradually and the frequency of the system tends to approach the standard frequency. At a predetermined point in the approach to equality of frequencies, the time allowed for the lifting of the interrupter relay contacts $J^2$ becomes sufficient for them to complete their lift before the lifting of the auxiliary synchronizing relay contacts $G^4$, and from then onwards the amount of interruption in the supply of energizing currents to the auxiliary motors $K^2$ is increased, so that the approach to synchronism becomes more gradual. Ultimately the state of synchronism is reestablished and the load-sharing devices M complete their operation of uniformly distributing the load.

In the case when the load change acts to decrease the system frequency both synchronizing relays E G repeatedly operate but in such a manner that the auxiliary synchronizing relay contacts $G^4$ are never down when the synchronizing relay contacts $E^4$ are down. Thus current is intermittently supplied to the other speed-control busbar $C^6$ and thence through such wattmeter interlock contacts $M^2$ as are closed to the raise-speed contactors K of the running machines. Thus the speed of all machines (except those taking too great a load) is increased gradually and ultimately the normal synchronous conditions are reestablished in a manner corresponding to that just described for the opposite frequency change, the interrupter relay J functioning as before at the appropriate moment.

It will now be assumed that the load conditions have changed to such an extent as to require an additional machine being brought into circuit. On this incoming machine the wattmeter interlock contacts $M^1$ $M^2$ are out of circuit owing to the fact that the circuit-breaker L is open and the two speed-control contactors K $K^1$ are connected to the opposite speed-control busbars $C^5$ $C^6$ through the synchronizing auxiliary contacts $B^4$ $B^5$. The circuit-breaker closing coil $L^1$ is also connected through synchronizing auxiliary contacts $B^3$ to the circuit-breaker closing busbar $C^7$, and the synchronizing plug $B^2$ is inserted to connect the leading phase $A^2$ of the potential transformer secondary to the synchronizing busbar $C^2$. This energizes the change-over relay F whose contacts begin to lift, at once deenergizing at contacts $F^4$ the synchronizing relay E and ensuring that its contacts are down before synchronizing operations commence. The change-over relay F also breaks at $F^5$ the short-circuit across the time-lag relay H and substitutes at $F^1$ the synchronizing busbar $C^2$ for the lead to the A. C. generator $D^1$. The synchronizing relays now operate in accordance with the phase-relationship between the voltages of the incoming and running machines.

Since the incoming machine speed is less than that of the running machines, (assuming that the machine was started up from rest), the synchronizing relay E remains inoperative, and energizing current is intermittently supplied to one speed-control busbar $C^5$ which is now connected to the raise-speed contactor K of the incoming machine. The further interruption in the supply of energizing current to the auxiliary motor $K^2$ is brought about by the interrupter relay J as before at the appropriate moment, and these conditions continue until synchronous speed is reached and passed. The synchroscope needle now comes to rest and rotates in the reverse direction. During the first rotation in the reverse direction the synchronizing relay E comes into operation and at once energizes the time-lag relay H. Since the rate of rotation of the synchroscope needle is at this stage very slow, the time-lag relay contacts $H^4$ complete their lift and complete the energizing circuit through the circuit-breaker closing busbar $C^7$ to the circuit-breaker closing coil $L^1$ of the incoming machine. After a time sufficient to allow the circuit-breaker L to close the interrupter relay contacts $J^1$ $J^2$, short-circuit the time-lag relay H and break the circuit to the speed-control busbars $C^5$ $C^6$. The synchronizing plugs $B^2$ $B^3$ $B^4$ $B^5$ are now removed, with the result that the change-over relay F is deenergized to reestablish the normal frequency control circuits for comparison of the system frequency with the standard frequency, the load-sharing devices M also operating to redistribute the load in view of the additional machine.

If it happens that the additional machine to be brought into circuit is already rotating at a speed greater than synchronizing speed, when synchronizing operations are commenced, the synchronizing relays will function in a manner generally similar to that described for frequency control when the system frequency falls below the standard frequency, and the circuit-breaker closing circuit will be completed by the operation of the time-lag relay contacts $H^4$ when the lower-speed contactor $K^1$ has caused the auxiliary motor $K^2$ to reduce the incoming machine speed sufficiently nearly to the synchronous value.

Figure 1 illustrates an adaptation of the above arrangement to the remote control from a control station of the frequency and load conditions in a system supplied from a number of generating substations. The upper half of Figure 2 shows the control station equipment wherein a number of control panels N $N^1$ $N^2$ one for each substation are provided, each control panel being connected through seven pilot wires O $O^1$ $O^2$ $O^3$ $O^4$ $O^5$ $O^6$ to its substation. One of the substation equipments is shown in the lower half of Figure 2.

The general principles governing this modification are that frequency control of the whole system is carried out automatically from the control station; automatic load-sharing between the individual machines takes place in each substation; the distribution of load between the various substations is controlled by hand from the control station; and automatic synchronizing of an additional machine is carried out in each substation under the control of a selective remote control system operated from the control station. This selective remote control system forms no part of the present invention and may be of any suitable kind, such that a selector device diagrammatically indicated at P $P^1$ is caused by currents transmitted, say, over three pilot wires O $O^1$ $O^2$ to take up successive positions in which contacts are operated respectively associated with the individual machines in the substation. Only those parts of the remote control system are indicated which are of interest to the present invention, namely four selector contacts $P^2$ $P^3$ $P^4$ $P^5$, which are closed when a particular machine has been selected to be synchronized and brought into circuit and correspond to the four synchronizing plugs $B^2$ $B^3$ $B^4$ $B^5$ of Figure 1.

The remaining apparatus in the substation is to a large extent identical with that of Figure 1 and the corresponding parts are indicated for convenience by small letters corresponding to the capital letters of Figure 1, these parts not being described in detail except in so far as they differ from Figure 1. Each machine $a$ in the substation is provided with a potential transformer whose secondary phase winding $a^3$ is earthed whilst the leading phase $a^2$ is connected through the selector contact $P^2$ to a synchronizing busbar $c^2$. The raise-speed and lower-speed contactors $k$ $k^1$ are connected through auxiliary contacts $l^3$ $l^3$ on the circuit-breaker $l$ either to speed-control busbars $c^5$ $c^6$ from the substation synchronizing apparatus or through the automatic load-sharing interlock contacts $m^1$ $m^2$ to a pair of speed-control busbars $Q^1$ $Q^2$ alternatively energized from the local D. C. source $c^3$ $c^4$ under the control of a polarized relay Q connected across the pilot wires $O^5$ $O^6$.

The synchronizing apparatus is identical with that of Figure 1 except that the change-over relay F is omitted, the two sides of the resistance $q^1$ being connected to the two pilot wires $O^3$ $O^4$ which are energized respectively from the lagging and leading phases $R^4$ $R^2$ of the secondary of a potential transformer R¹ on the substation load circuit, the other secondary phase-winding R³ being earthed.

At the control station end the pilot wires O³ O⁴ are taken through frequency plugs S S¹ respectively to lagging and leading phase busbars T T¹ leading to the frequency controlling apparatus. The pilot wires O⁵ O⁶ are taken respectively through contacts U¹ U² on a raise-load hand-switch U and contacts V¹ V² on a lower-load hand-switch V and thence through frequency plugs S² S³ to speed-control busbars T² T³ leading from the frequency controlling apparatus. If the raise-load switch V is depressed the pilots O⁵ O⁶ are directly connected to a local D. C. source T⁴ T⁵ whilst if the lower-load switch is depressed the pilots O⁵ O⁶ are connected to the same D. C. source T⁵ T⁴ but with opposite polarity.

The frequency controlling apparatus is generally similar to that of Figure 1 and comprises a constant speed D. C. motor W driving an A. C. generator W¹ one lead from which is earthed, whilst the other lead is taken to one side of an auxiliary synchronizing relay Y and to one side of a resistance X¹, the other side of which is connected to the leading phase busbar T¹. The other side of the auxiliary synchronizing relay Y is connected to the mid-point of a resistance Y¹ connected between the leading and lagging phase busbars T T¹. A synchronizing relay X is connected between the mid-point of the resistance X¹ and earth through the normally open contacts Y² of the auxiliary synchronizing relay Y, and makes its own retaining circuit at X². An interrupter relay Z is energized from the local D. C. source T⁴ T⁵ under the control of normally closed contacts Y³ on the auxiliary synchronizing relay Y, and is provided with normally closed contacts Z¹ Z² respectively in series with normally closed contacts Y³ Y⁴ on the auxiliary synchronizing relay and change-over contacts X³ X⁴ on the synchronizing relay, these contacts controlling the polarity of the current supplied from the D. C. source T⁴ T⁵ to the speed-control busbars T² T³.

The operation of the frequency controlling apparatus, as also of the synchronizing and load-sharing apparatus in the substation will be clear from the description above given in connection with Figure 1.

Thus for controlling the frequency of a substation, the frequency plugs S S¹ S² S³ are inserted, and the frequency controlling apparatus will transmit over the pilot wires O⁵ O⁶ current of one polarity or the other depending on whether the frequency is high or low. This will operate the polarized relay Q which will act through the load-sharing contacts $m^1$ $m^2$ to energize one or other of the speed-control contactors k k¹ of those machines whose speed is to be altered.

When it is desired to raise the load taken by one substation, the corresponding raise-load switch U is depressed. This first disconnects the pilots O⁵ O⁶ from the frequency control apparatus and then connects them directly to the D. C. source T⁴ T⁵, whereby the polarized relay Q is operated in such a direction as to raise the speed of all the machines in the substation taking average or less than average load. An analogous operation takes place on depression of the lower-load switch V.

If the load conditions in the substation are such as to require the services of an additional machine, the selective remote control apparatus is operated to select the additional machine and to close the contacts P² P³ P⁴ P⁵ associated therewith. This brings into operation the substation synchronizing apparatus which acts in the manner described with reference to Figure 1 to synchronize and bring into circuit the additional machine.

It will be appreciated that the above arrangements have been described by way of example only and may be modified in various ways within the scope of the invention.

What I claim as my invention and desire to secure by Letters Patent is:—

1. In electric synchronizing apparatus for maintaining constant the speed or frequency of an A. C. dynamo-electric machine, the combination of a source of E. M. F. of standard frequency, means for raising or lowering the speed of the machine, a relay device operative in accordance with the relation between the machine speed and the standard frequency, a source of controlling current for energizing the speed-controlling means, means whereby the relay device acts to control the transmission of impulses derived from such source for the selective operation of the speed-controlling means, and means whereby the rate of transmission of the impulses is gradually reduced as the machine speed is brought into agreement with the standard frequency.

2. In electric synchronizing apparatus for controlling the frequency of an electric system supplied from an A. C. dynamo-electric machine, the combination with a source of E. M. F. of standard frequency, of a second source of E. M. F. derived from the system, a system of relays which are operated in accordance with the relation between the frequencies of the two sources of E. M. F., a source of controlling current, means whereby the relays act to control the transmission of impulses derived from such source for varying the speed of the machine, and means whereby the rate of transmission of the impulses is gradually reduced as the two frequencies are brought into agreement.

3. In electric synchronizing apparatus for controlling the frequency of an electric system supplied from a group of A. C. dynamo-electric machines operating in parallel, the combination with a source of E. M. F. of standard frequency, of a second source of E. M. F. derived from the system, a relay device responsive to the relation between the frequencies of the two sources of E. M. F., devices responsive to the load conditions in the system and acting to ensure a proper distribution of load to the individual machines, and means whereby the relay device and the load-sharing devices act to control the frequency of the system.

4. In electric synchronizing apparatus for controlling the frequency of an electric system supplied from a group of A. C. dynamo-electric machines operating in parallel, the combination with a source of E. M. F. of standard frequency, of a second source of E. M. F. derived from the system, a relay device normally responsive to the relation between the frequencies of the two sources of E. M. F. and acting to control the frequency of the system, and means whereby the same relay device can be utilized to control the synchronizing and bringing into circuit of an additional machine.

5. In electric synchronizing apparatus for controlling the frequency of an electric system supplied from a group of A. C. dynamo-electric machines operating in parallel, the combination with a source of E. M. F. of standard frequency, of a second source of E. M. F. derived from the system, a system of relays normally responsive to the relation between the frequencies of the two sources of E. M. F. and acting to control the frequency of the system, a third source of E. M. F. derived from the incoming machine, and a change-over relay which controls the connection of the system of relays to the sources of E. M. F. whereby the relays are responsive either to the first and second sources of E. M. F. or to the second and third sources of E. M. F., the same system of relays thus being utilized also for controlling the synchronizing and bringing into circuit of an additional machine.

6. In electric synchronizing apparatus for controlling from a control station the frequency of an electric system supplied from groups of A. C. dynamo-electric machines located in substations, the combination with a source of E. M. F. of standard frequency in the control station, of a source of E. M. F. derived from the system in each substation and connected to the control station through pilot wires, a system of relays at the control station responsive to the relation between the frequencies of the standard source of E. M. F. and any of the substation sources of E. M. F. to which they are connected, devices in each substation for automatically controlling the distribution of load amongst the individual machines in the substation, hand-operated means at the control station for controlling the distribution of load amongst the substations, and means whereby the frequency-responsive relays or the hand-operated load-sharing means act in conjunction with the automatic load-sharing devices to control the speed of the machines in each substation.

7. Electric synchronizing apparatus as claimed in claim 2, in which the relay device which is responsive to the relation between the frequencies of two sources of E. M. F. comprises a plurality of relays including a synchronizing relay which receives its maximum energizing current when the two sources of E. M. F. are in phase with one another, and an auxiliary synchronizing relay which acts to render the synchronizing relay inoperative when the frequency of the electric system is greater than that of the other source of E. M. F.

8. Electric synchronizing apparatus as claimed in claim 3, in which the relay device which is responsive to the relation between the frequencies of two sources of E. M. F. comprises a plurality of relays including a synchronizing relay which receives its maximum energizing current when the two sources of E. M. F. are in phase with one another, and an auxiliary synchronizing relay which acts to render the synchronizing relay inoperative when the frequency of the electric system is greater than that of the other source of E. M. F.

9. Electric synchronizing apparatus as claimed in claim 4, in which the relay device which is responsive to the relation between the frequencies of two sources of E. M. F. comprises a plurality of relays including a synchronizing relay which receives its maximum energizing current when the two sources of E. M. F. are in phase with one another, and an auxiliary synchronizing relay which acts to render the synchronizing relay inoperative when the frequency of the electric system is greater than that of the other source of E. M. F.

10. Electric synchronizing apparatus as claimed in claim 5, in which the system of relays which is responsive to the relation between the frequencies of two sources of E. M. F. includes a synchronizing relay which receives its maximum energizing current when the two sources of E. M. F. are in phase with one another, and an auxiliary synchronizing relay which acts to render the synchronizing relay inoperative when the frequency of the electric system is greater than that of the other source of E. M. F.

11. Electric synchronizing apparatus as claimed in claim 6, in which the system of relays which is responsive to the relation between the frequencies of two sources of E. M. F. includes a synchronizing relay which receives its maximum energizing current when the two sources of E. M. F. are in phase with one another, and an auxiliary synchronizing relay which acts to render the synchronizing relay inoperative when the frequency of the electric system is greater than that of the other source of E. M. F.

12. Electric synchronizing apparatus as claimed in claim 3, in which when the share of the load taken by an individual machine lies outside predetermined limits, the load-sharing device associated with that machine acts to prevent the speed of the machine from being altered if such alteration would tend to make the load taken by the machine deviate further from such limits.

13. Electric synchronizing apparatus as claimed in claim 6, in which when the share of the load taken by an individual machine lies outside predetermined limits, the load-sharing device associated with that machine acts to prevent the speed of the machine from being altered if such alteration would tend to make the load taken by the machine deviate further from such limits.

14. In electric synchronizing apparatus as claimed in claim 6, the combination with a system of relays in each substation for controlling the synchronizing and bringing into circuit of an additional machine in the substation, of a selective remote control arrangement for each substation whereby an operator at the control station can select an individual machine in the substation and cause the selected machine to be synchronized and brought into circuit under the control of such system of relays.

In testimony whereof I have signed my name to this specification.

THOMAS REGINALD WARREN.